US012574834B2

(12) United States Patent
Yan et al.

(10) Patent No.: US 12,574,834 B2
(45) Date of Patent: Mar. 10, 2026

(54) NETWORK SLICE SELECTION, MANAGEMENT, AND POLICY CONTROL FOR VEHICLE-TO-EVERYTHING (V2X) SERVICES

(71) Applicant: ZTE CORPORATION, Guangdong (CN)

(72) Inventors: Xiaojian Yan, Shenzhen (CN); Hao Dong, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 388 days.

(21) Appl. No.: 18/104,704

(22) Filed: Feb. 1, 2023

(65) Prior Publication Data

US 2023/0284128 A1     Sep. 7, 2023

Related U.S. Application Data

(63) Continuation of application No. PCT/CN2020/107060, filed on Aug. 5, 2020.

(51) Int. Cl.
| | |
|---|---|
| *H04W 48/18* | (2009.01) |
| *H04W 4/40* | (2018.01) |
| *H04W 28/02* | (2009.01) |
| *H04W 92/18* | (2009.01) |

(52) U.S. Cl.
CPC .............. *H04W 48/18* (2013.01); *H04W 4/40* (2018.02); *H04W 28/0268* (2013.01); *H04W 92/18* (2013.01)

(58) Field of Classification Search
CPC ... H04W 48/18; H04W 4/40; H04W 28/0268; H04W 92/18; H04W 84/00; H04W 8/20; H04W 88/14; H04W 92/24; H04W 8/08; H04W 28/0257; Y02D 30/70; H04L 41/0893
See application file for complete search history.

(56) References Cited

U.S. PATENT DOCUMENTS

| | | | | |
|---|---|---|---|---|
| 11,082,882 B2 * | 8/2021 | Cho | ...................... | H04W 76/11 |
| 11,412,092 B2 * | 8/2022 | Cheng | ................. | H04L 12/1407 |
| 11,432,135 B2 * | 8/2022 | Shan | ................... | H04L 12/1403 |
| 11,758,405 B2 * | 9/2023 | Paladugu | .............. | H04W 12/08 726/1 |

(Continued)

FOREIGN PATENT DOCUMENTS

| | | |
|---|---|---|
| CN | 110603830 A | 12/2019 |
| CN | 111093285 A | 5/2020 |

OTHER PUBLICATIONS

3rd Generation Partnership Project, Technical Specification Group Services and System Aspects; Architecture enhancements for 5G System (5GS) to support Vehicle-to-Everything (V2X) services (Release 16), 3GPP TS 23.287, V16.3.0, Jul. 9, 2020, Valbonne, France (57 pages).

(Continued)

*Primary Examiner* — Mounir Moutaouakil
(74) *Attorney, Agent, or Firm* — Foley & Lardner LLP

(57) ABSTRACT

A wireless communication method for use in an access and mobility management function is disclosed. The wireless communication method comprises transmitting, to a policy control function, PCF, allowed network slice selection assistance information, NSSAI, associated with a wireless terminal.

12 Claims, 10 Drawing Sheets

(56) References Cited

U.S. PATENT DOCUMENTS

| | | | | |
|---|---|---|---|---|
| 11,943,664 | B2 * | 3/2024 | Pfadler | H04W 28/26 |
| 12,004,111 | B2 * | 6/2024 | Shan | H04W 4/40 |
| 12,010,545 | B2 * | 6/2024 | Kim | H04W 28/0268 |
| 12,200,741 | B2 * | 1/2025 | Ying | H04W 72/53 |
| 2019/0037448 | A1 | 1/2019 | Shan et al. | |
| 2019/0313359 | A1 | 10/2019 | Lee et al. | |
| 2019/0313469 | A1 | 10/2019 | Karampatsis et al. | |
| 2020/0112841 | A1 | 4/2020 | Kim et al. | |
| 2020/0163010 | A1 | 5/2020 | Qiao et al. | |

OTHER PUBLICATIONS

3rd Generation Partnership Project, Technical Specification Group Services and System Aspects; Policy and charging control framework for the 5G System (5GS); Stage 2 (Release 16), 3GPP TS 23.503, V16.5.0, Jul. 9, 2020, Valbonne, France (118 pages).

3rd Generation Partnership Project, Technical Specification Group Services and System Aspects; Procedures for the 5G System (5GS); Stage 2 (Release 16), 3GPP TS 23.502, V16.5.0, Jul. 9, 2020, Valbonne, France (594 pages).

3rd Generation Partnership Project, Technical Specification Group Services and System Aspects; System architecture for the 5G system (5GS); Stage 2 (Release 16), 3GPP TS 23.501, V16.5.1, Aug. 3, 2020, Valbonne, France (440 pages).

Extended European Search Report for EP Appl. No. 20948483.1, dated Jul. 28, 2023.

3rd Generation Partnership Project, "Technical Specification Group Services and System Aspects, Study on system enhancement for Proximity based Services (ProSe) in the 5G System (5GS) (Release 17)," 3GPP TR 23.752, V0.4.0, Jun. 2020 (172 pages).

International Search Report and Written Opinion for PCT Appl. No. PCT/CN2020/107060, mailed May 8, 2021 (7 pages).

First Office Action for CN Appl. No. 202080104389.8, dated Apr. 19, 2025 (with English translation, 13 pages).

Office Action for KR Appl. No. 10-2023-7004166, dated Jun. 29, 2025 (with English translation, 7 pages).

* cited by examiner

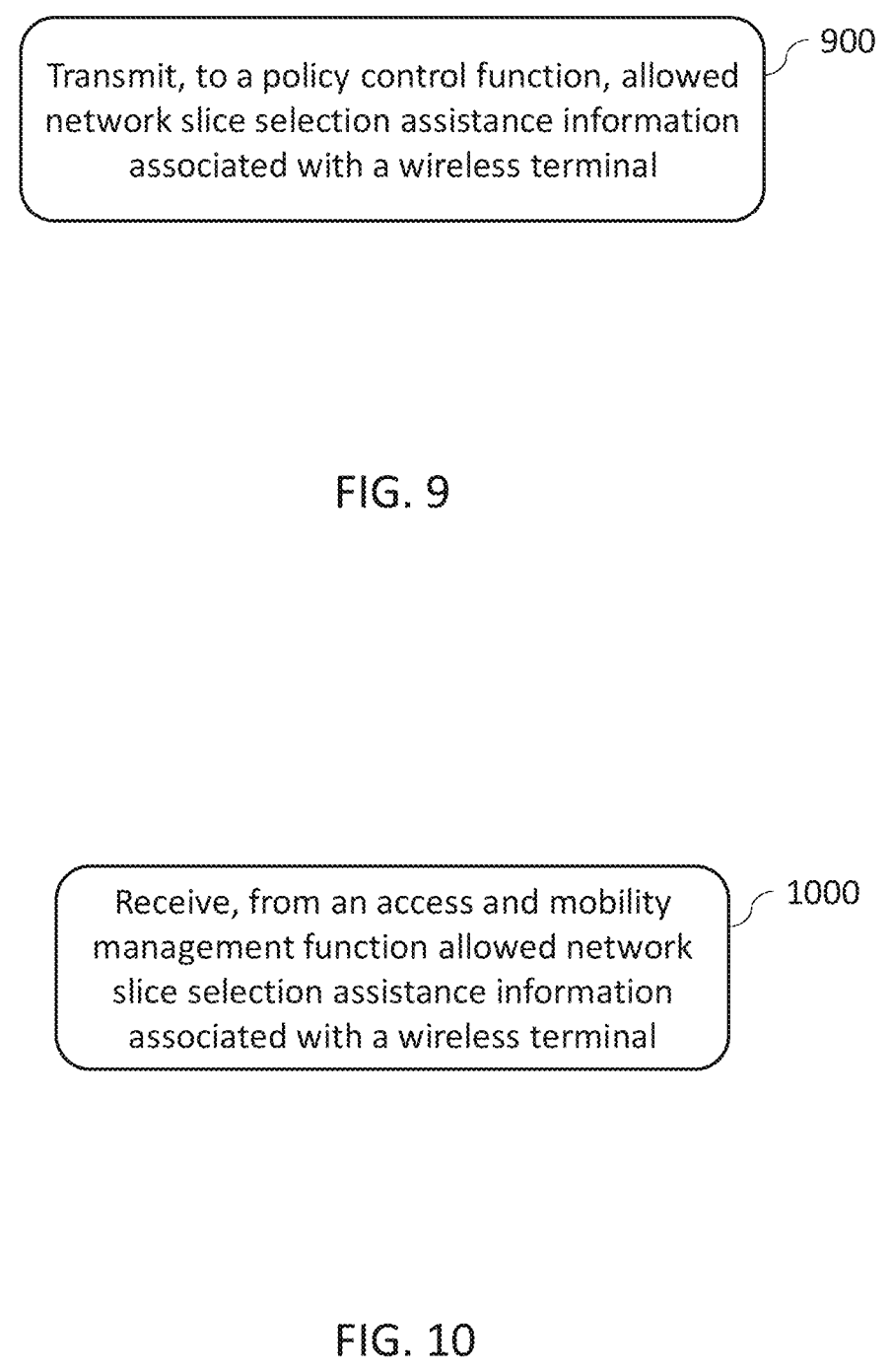

Transmit, to a policy control function, allowed network slice selection assistance information associated with a wireless terminal ⌐ 900

FIG. 9

Receive, from an access and mobility management function allowed network slice selection assistance information associated with a wireless terminal ⌐ 1000

FIG. 10

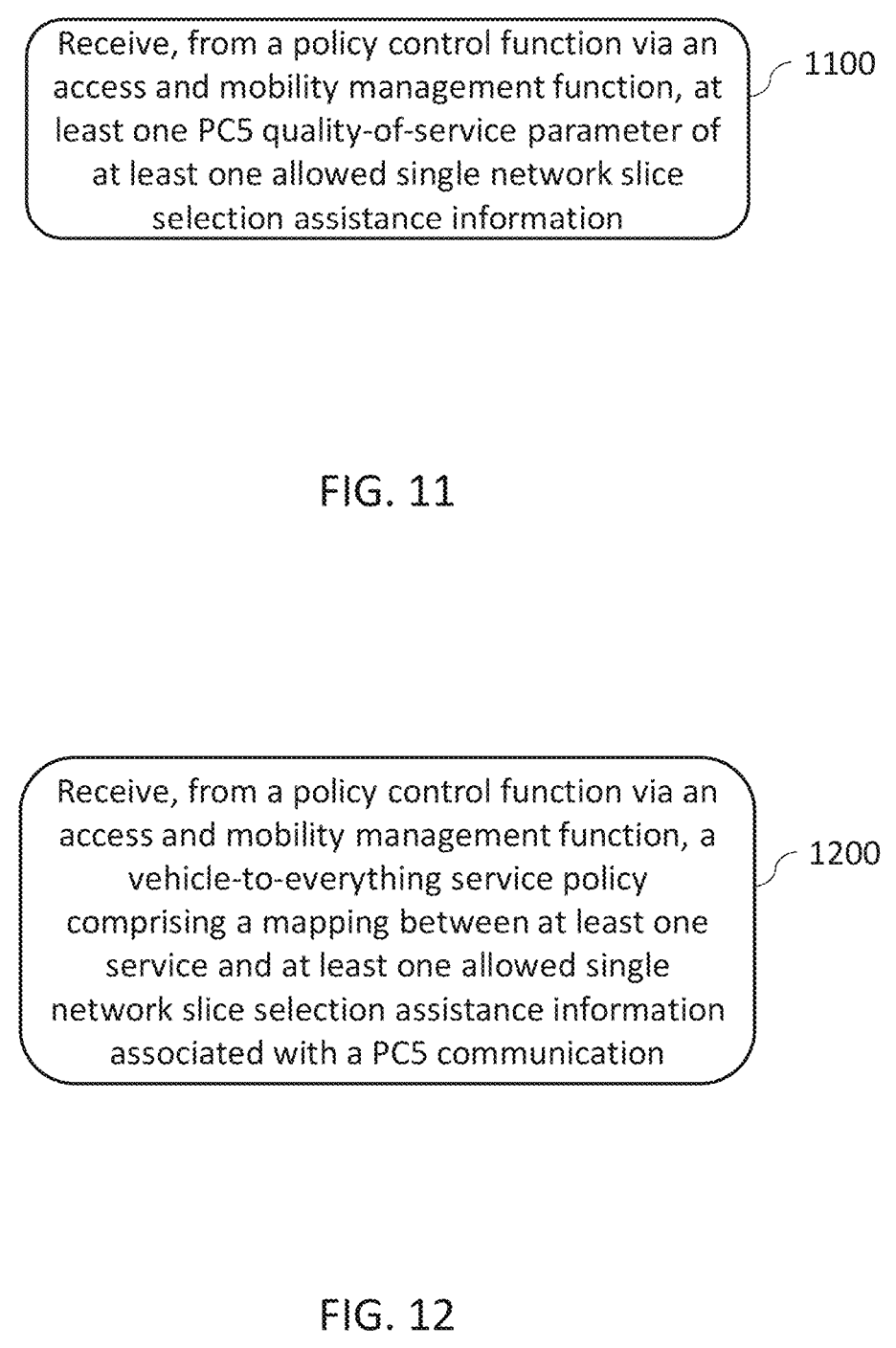

Receive, from a policy control function via an access and mobility management function, at least one PC5 quality-of-service parameter of at least one allowed single network slice selection assistance information ⟋ 1100

FIG. 11

Receive, from a policy control function via an access and mobility management function, a vehicle-to-everything service policy comprising a mapping between at least one service and at least one allowed single network slice selection assistance information associated with a PC5 communication ⟋ 1200

FIG. 12

NETWORK SLICE SELECTION, MANAGEMENT, AND POLICY CONTROL FOR VEHICLE-TO-EVERYTHING (V2X) SERVICES

This application is a continuation of PCT/CN2020/107060, filed Aug. 5, 2020, the content of which is incorporated herein by reference in its entirety.

TECHNICAL FIELD

This document is directed generally to wireless communications.

BACKGROUND

V2X communication is a communication supporting Vehicle-to-Everything (V2X) services leveraging Uu and/or PC5 reference points. V2X services are realized by various types of V2X applications, i.e. Vehicle-to-Vehicle (V2V), Vehicle-to-Pedestrian (V2P), Vehicle-to-Infrastructure (V2I) and Vehicle-to-Network (V2N). The main motivation behind V2X comprises road safety, traffic efficiency, and energy savings. Proximity services (ProSe) are one of the keys for enabling the support of the V2X communication. The ProSe functions include direct discovery and direct communication via PC5 interface. The PC5 interface is a reference point between ProSe-enabled user equipments (UEs) used for control plane and user plane for ProSe direct discovery, ProSe direct communication and ProSe UE-to-Network relay.

Network slice is a logical network that provides specific network capabilities and network characteristics. Network slice instance is a set of Network function instances and the required resources (e.g. compute, storage and networking resources) which form a deployed network slice. Multiple network slice instances can be deployed on one shared physical network and each network slice instance is designed to meet specific service requirements. In addition, each network slice instance is isolated from each other. In order to access the network slice, the UE should be authenticated by the network operator and authenticated/authorized by the owner of the network slice.

V2X communication has its own specific service requirements regarding the latency, jitter and bandwidth. Therefore, it is possible to deploy dedicated network slice for V2X communication. Actually, 3GPP already defined a special SST (slice service type=4) for V2X network slice. The slice concept is only considered when the V2X communication is via the PDU session, i.e. via the Uu interface and the network. However, how to use the network slice concept via the PC5 interface is unclear, especially when the UE is not authorized by the owner of the network slice. Thus, how to restrict the UE to use the network slice resource is also unknown.

This document relates to methods, systems, and devices of slice support for V2X service.

SUMMARY

The present disclosure relates to a wireless communication method for use in an access and mobility management function, the wireless communication method comprising:

transmitting, to a policy control function, PCF, allowed network slice selection assistance information, NSSAI, associated with a wireless terminal.

Various embodiments may preferably implement the following features:

Preferably, at least one single-NSSAI in the allowed NSSAI is associated with a vehicle-to-everything service.

Preferably, the wireless communication method further comprises receiving, from the PCF, at least one PC5 quality-of-service, QoS, parameter associated with at least one allowed S-NSSAI in the NSSAI, and transmitting, to a first radio access network node, the at least one PC5 QoS parameter and the at least one allowed S-NSSAI.

Preferably, the at least one PC5 QoS parameter comprises an aggregated maximum bit rate per network slice.

Preferably, the wireless communication method further comprises receiving, from the PCF, a validity area of the at least one PC5 QoS parameter.

Preferably, the wireless communication method further comprises receiving an indication of a handover of moving the wireless terminal to a second radio access network node, and determining whether to transmit the at least one PC5 QoS parameter to the second radio access network node based on the validity area and a location of the wireless terminal.

Preferably, the wireless communication method further comprises receiving, from the PCF, a vehicle-to-everything service policy comprising a mapping between at least one service and at least one S-NSSAI associated with a PC5 communication, and transmitting, to the wireless terminal, the vehicle-to-everything service policy.

The present disclosure relates to a wireless communication method for use in a policy control function, the wireless communication method comprises:

receiving, from an access and mobility management function, AMF, allowed network slice selection assistance information, NSSAI, associated with a wireless terminal.

Various embodiments may preferably implement the following features:

Preferably, at least one allowed single-NSSAI, S-NSSAI, in the NSSAI is associated with a vehicle-to-everything service for a PC5 communication.

Preferably, the wireless communication method further comprises transmitting, to the AMF, at least one PC5 quality-of-service, QoS, parameter associated with at least one allowed S-NSSAI in the NSSAI.

Preferably, the at least one PC5 QoS parameter comprises an aggregated maximum bit rate per network slice.

Preferably, the wireless communication method further comprises transmitting, to the AMF, a validity area of the at least one PC5 QoS parameter.

Preferably, the wireless communication method further comprises transmitting, to the AMF, a vehicle-to-everything service policy comprising a mapping between at least one service and at least one S-NSSAI associated with a PC5 communication.

The present disclosure relates to a wireless communication method for use in a radio access network node. The wireless communication method comprises:

receiving, from a policy control function, PCF, via an access and mobility management function, AMF, at least one PC5 quality-of-service, QoS, parameter of at least one allowed single network slice selection assistance information, S-NSSAI.

Various embodiments may preferably implement the following features:

Preferably, the at least one allowed S-NSSAI is associated with a vehicle-to-everything service for a PC5 communication.

Preferably, the wireless communication method further comprises receiving, from a wireless terminal, a requested S-NSSAI and a requested QoS file for a PC5 communication, and transmitting, to the wireless terminal, radio bearer information of the PC5 communication when determining the requested S-NSSAI and the requested QoS file are authorized based on the at least one PC5 QoS parameter per allowed S-NSSAI.

The present disclosure relates to a wireless communication method for use in a wireless terminal. The wireless communication method comprises:

receiving, from a policy control function, PCF, via an access and mobility management function, AMF, a vehicle-to-everything service policy comprising a mapping between at least one service and at least one S-NSSAI associated with a PC5 communication.

Various embodiments may preferably implement the following features:

Preferably, the wireless communication method further comprises determining a requested S-NSSAI for a PC5 communication based on the vehicle-to-everything service policy, and transmitting, to a radio access network node, the requested S-NSSAI and a requested QoS file for the PC5 communication.

Preferably, the wireless communication method further comprises receiving, from the radio access network node, radio bearer information of the PC5 communication, and establishing, with a peer wireless terminal, a radio bearer of the PC5 communication.

The present disclosure relates to a wireless device comprising an access and mobility management function. The wireless device comprises a communication unit, configured to transmit, to a policy control function, PCF, allowed network slice selection assistance information, NSSAI, associated with a wireless terminal.

Various embodiments may preferably implement the following feature:

Preferably, the wireless device comprises a processor configured to perform a wireless communication method of any of the foregoing described methods.

The present disclosure relates to a wireless device comprising a policy control function. The wireless device comprises a communication unit, configured to receive, from an access and mobility management function, AMF, allowed network slice selection assistance information, NSSAI, associated with a wireless terminal.

Various embodiments may preferably implement the following feature:

Preferably, the wireless device comprises a processor configured to perform a wireless communication method of any of the foregoing described methods.

The present disclosure relates to a wireless network node. The wireless network node comprises a communication unit, configured to receive, from a policy control function, PCF, via an access and mobility management function, AMF, at least one PC5 quality-of-service, QoS, parameter of at least one allowed single network slice selection assistance information, S-NSSAI.

Various embodiments may preferably implement the following feature:

Preferably, the wireless network node comprises a processor configured to perform a wireless communication method of any of the foregoing described methods.

The present disclosure relates to a wireless terminal. The wireless terminal comprises a communication unit, configured to receive, from a policy control function, PCF, via an access and mobility management function, AMF, a vehicle-to-everything service policy comprising a mapping between at least one service and at least one S-NSSAI associated with a PC5 communication.

Various embodiments may preferably implement the following feature:

Preferably, the wireless terminal comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION OF THE DRAWINGS

FIG. 9 shows a flowchart of a process according to an embodiment of the present disclosure.

FIG. 10 shows a flowchart of a process according to an embodiment of the present disclosure.

FIG. 11 shows a flowchart of a process according to an embodiment of the present disclosure.

FIG. 12 shows a flowchart of a process according to an embodiment of the present disclosure.

DETAILED DESCRIPTION

Figure 1:
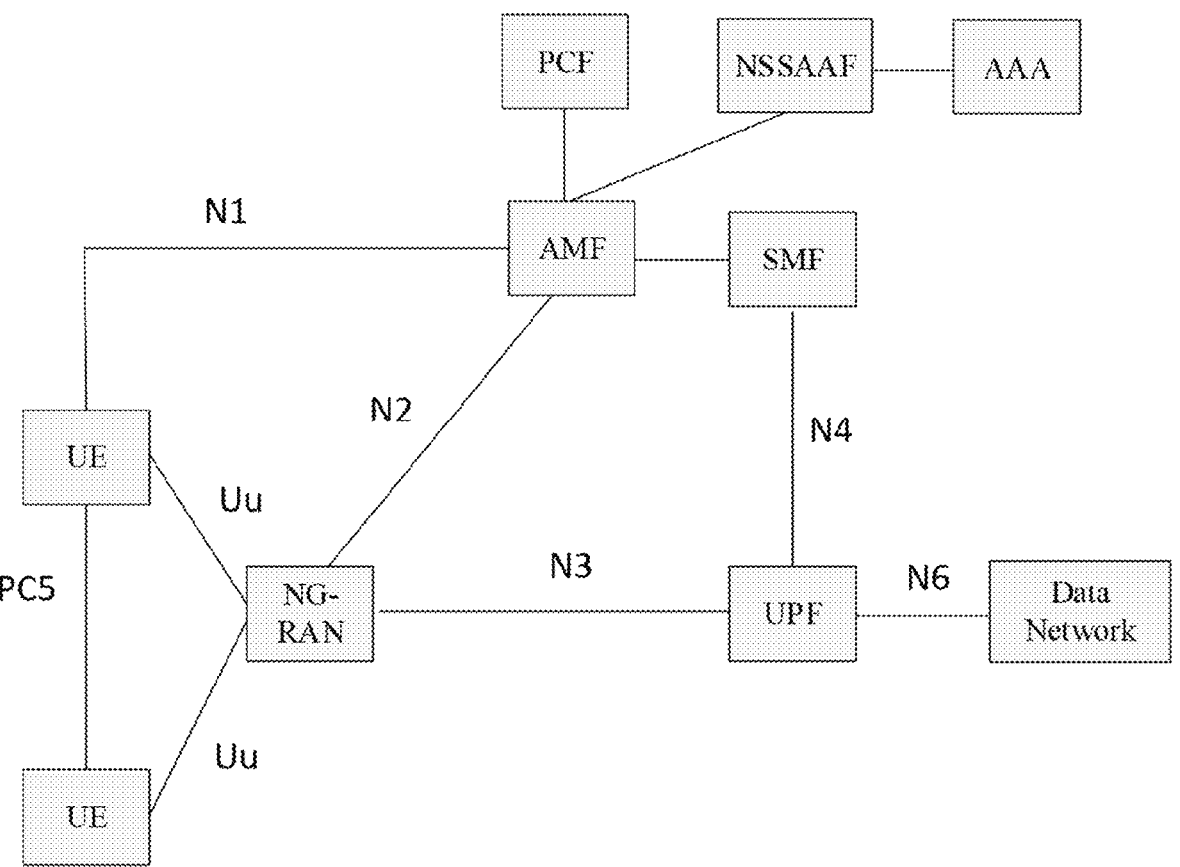
FIG. 1 illustrates the architecture for V2X communication according to an embodiment of the present disclosure.

FIG. 1 illustrates the architecture for V2X communication according to an embodiment of the present disclosure. In the following, the functions of the various elements of FIG. 1 are described.

The UE supports V2X requirements and associated procedures. The V2X enabled UE supports V2X Direct Communication over the PC5 interface. In addition, the V2X enabled UE also supports retrieving the V2X related policy/parameters from the core network or from an application server.

These V2X related policy/parameters may also be pre-configured in the UE. The UE may be configured to use a network scheduled operation mode or a UE autonomous resources selection mode. For the network scheduled operation mode, the radio resources for V2X service is controlled by the network. For the UE autonomous resources selection mode, the UE selects the radio resources for the V2X service based on its local policy/parameters.

The Next Generation-Radio Access Network (NG-RAN) manages the radio resources for V2X direct communication for the network scheduled operation mode UE. The NG-RAN also provides V2X authorization and V2X PC5 QoS parameters for the V2X enabled UE.

The Access and Mobility Management function (AMF) includes the following functionalities: Registration management, Connection management, Reachability management and Mobility Management. The AMF also performs the access authentication and access authorization. The AMF is the non-access-stratum (NAS) security termination and relays the session management (SM) NAS between the UE and an SMF, etc. Based on the subscription, the AMF provides V2X authorization indication to the NG-RAN.

The Session Management Function (SMF) includes the following functionalities: session establishment, modification and release, UE IP address allocation and management (including optional authorization functions), selection and control of UP function, downlink data notification, etc.

The User plane function (UPF) includes the following functionalities: serving as an anchor point for intra-/inter-radio access technology (RAT) mobility, packet routing and forwarding, traffic usage reporting, QoS handling for the user plane, downlink packet buffering and downlink data notification triggering, etc.

The Policy Control Function (PCF) provides policy rules to control plane functions, to enforce the rules. Specifically, the PCF provides Access and mobility related policy to the AMF and the AMF enforces them during mobility procedure, provides UE access selection and PDU Session selection related policy (UE policy) to the AMF and the AMF forwards them to the UE. The PCF also provides the V2X related policy/parameters to the UE/NG-RAN via the AMF. The PCF may be deployed in a distributed manner and each PCF may support different functions in the same public land mobile network (PLMN).

The Network Slice Specific Authentication and Authorization Function (NSSAAF) supports Network Slice-Specific Authentication and Authorization (NSSAA) with an authentication, authorization, and accounting (AAA) Server. The AMF performs NSSAA for S-NSSAIs (Single Network Slice Selection Assistance Information) of the HPLMN which are subject to it based on subscription information. Only if the S-NSSAI is successfully authenticated and authorized, the AMF includes it within allowed NSSAI.

The AAA server performs slice authentication and authorization for each S-NSSAI.

In the present disclosure, "PC5" may be equal to "PC5 interface", and vice versa.

The V2X related policy/parameter over PC5 interface in the UE includes the following non-exclusive information:

1) authorization policy, indicating the PLMNs in which the UE is authorized to perform V2X communications over the PC5 reference point when the UE is served by a radio network, and indicating whether the UE is authorized to perform V2X communications over the PC5 reference point when the UE is not served by the radio network;

2) policy/parameters when the PC5 interface is selected:

the mapping of V2X service types (e.g. provider service identifiers (PSIDs) or intelligent transportation system application identifiers (ITS-AIDs)) to V2X frequencies with geographical area(s);

the mapping of Destination Layer-2 ID(s) and the V2X service types, e.g. PSIDs or ITS-AIDs of the V2X application for broadcast;

The mapping of Destination Layer-2 ID(s) and the V2X service types, e.g. PSIDs or ITS-AIDs of the V2X application for groupcast;

The mapping of default Destination Layer-2 ID(s) for initial signaling to establish unicast connection and the V2X service types, e.g. PSIDs or ITS-AIDs of the V2X application;

PC5 quality-of-service (QoS) mapping configuration:

a. Input from V2X application layer:

i. V2X service type (e.g. PSID or ITS-AID);

ii. (optional) V2X Application Requirements for the V2X service type, e.g. priority requirement, reliability requirement, delay requirement, range requirement.

b. Output:

i. PC5 QoS parameters, i.e. presentation quality index (PQI) and conditionally other parameters such as maximum flow bit rate (MFBR), guaranteed flow bit rate (GFBR), per link aggregated maximum bit rate (AMBR), etc.

The V2X PC5 related parameters sent to the NG-RAN includes the following non-exclusive information:

a "V2X services authorized" indication, indicating the UE is authorized to use V2X communication over PC5 reference point as Vehicle UE, Pedestrian UE or both;

UE-PC5-AMBR per PC5 RAT and cross-RAT PC5 control authorization if applicable, used by NG-RAN for the resource management of UE's PC5 transmission for V2X services in network scheduled mode;

the PC5 QoS parameters used by the NG-RAN for the resource management of UE's PC5 transmission for V2X services in network scheduled mode.

Figure 2:
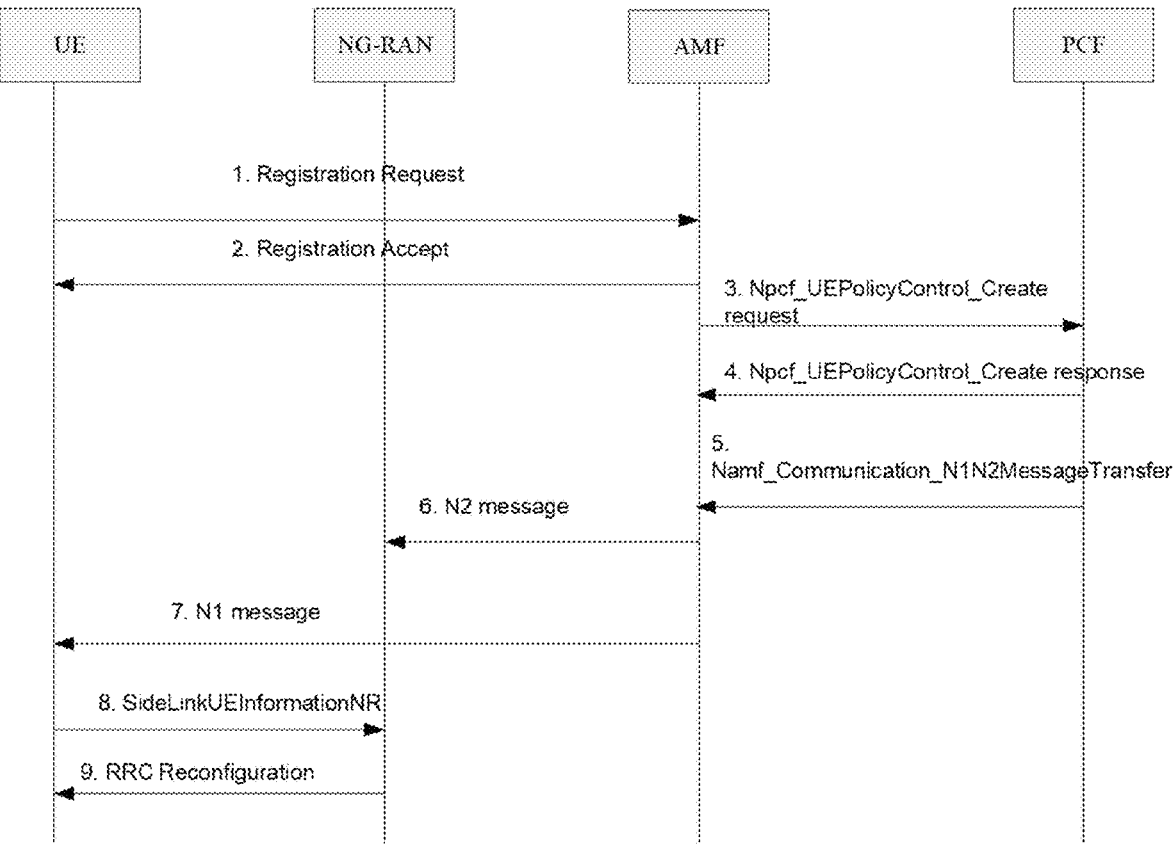
FIG. 2 illustrates delivery of the V2X related policy/parameter to the UE and delivery of the PC5 QoS parameters to the NG-RAN according to an embodiment of the present disclosure.

FIG. 2 illustrates how to deliver the V2X related policy/parameter to the UE and how to deliver the PC5 QoS parameters to the NG-RAN according to an embodiment of the present disclosure. In the following, the steps illustrated in FIG. 2 are described with reference to the numbering of the steps shown in FIG. 2.

1. The UE initiates a Registration Request towards the NG-RAN. The NG-RAN selects an AMF and forwards the Registration Request to the AMF. This message includes the PC5 capability for V2X.

2. The AMF performs a Registration procedure and accepts the UE registration. The AMF sends a Registration Accept message towards the UE.

3. During the registration procedure the AMF selects a PCF for UE policy and sends a Npcf_UEPolicyControl_Create request to the selected PCF including the PC5 capability for V2X that the UE indicates in step 1.

4. The PCF sends a Npcf_UEPolicyControl_Create response to the AMF. Based on the local configuration the PCF determines the V2X related Policy/parameter over PC5 corresponding to the UE, and the PC5 QoS parameters used by NG-RAN corresponding to the UE.

5. The PCF sends a Namf_Communication_N1N2MessageTransfer request to AMF including the V2X related policy/parameter determined in step 4. The AMF stores the PC5 QoS parameters as part of UE context.

6. The AMF forwards the PC5 QoS parameters in the NGAP message to the NG-RAN.

7. The AMF forwards the V2X related policy to the UE. Step 7 maybe piggybacked in step 6.

8. When the UE needs to initiate V2X communication via the PC5 and when the network scheduled operation mode is used, the UE determines the requested QoS profile and sends SidelinkUEInformationNR(requested QoS profile) to the NG-RAN.

9. The NG-RAN performs authorization and sends RRC Reconfiguration towards the UE and provides the authorized QoS profile to the UE. The UE then initiates the Direct communication towards the target UE by using the authorized QoS profile.

The procedure shown in FIG. 2 does not take the slice concept into consideration. Especially when the UE is not authenticated to use the network slice for V2X, it is unclear how to restrict the UE to use the direct communication via the PC5 interface which is deployed with the network slice.

Figure 3:
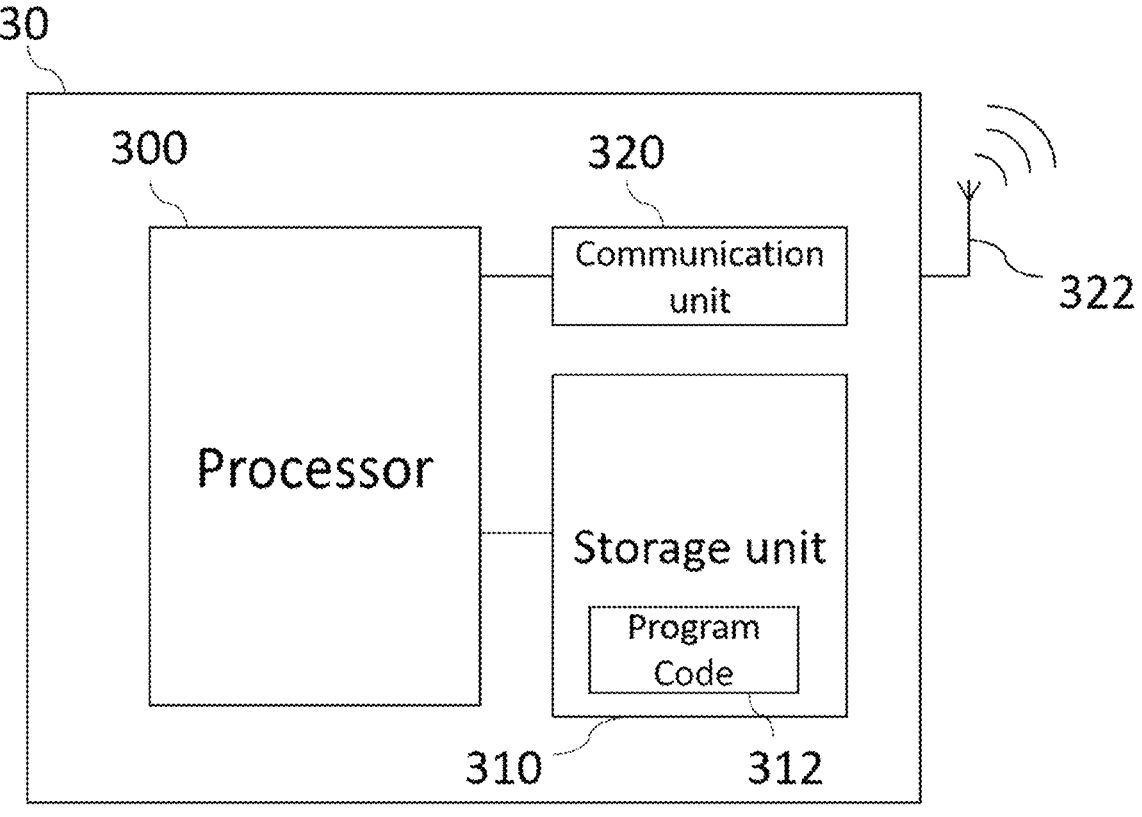
FIG. 3 shows an example of a schematic diagram of a wireless terminal according to an embodiment of the present disclosure.

FIG. 3 relates to a schematic diagram of a wireless terminal 30 according to an embodiment of the present disclosure. The wireless terminal 30 may be a user equipment (UE), a mobile phone, a laptop, a tablet computer, an electronic book or a portable computer system and is not limited herein. The wireless terminal 30 may include a processor 300 such as a microprocessor or Application Specific Integrated Circuit (ASIC), a storage unit 310 and a communication unit 320. The storage unit 310 may be any data storage device that stores a program code 312, which is accessed and executed by the processor 300. Embodiments of the storage unit 310 include but are not limited to a subscriber identity module (SIM), read-only memory (ROM), flash memory, random-access memory (RAM), hard-disk, and optical data storage device. The communication unit 320 may a transceiver and is used to transmit and receive signals (e.g. messages or packets) according to processing results of the processor 300. In an embodiment, the communication unit 320 transmits and receives the signals via at least one antenna 322 shown in FIG. 3.

In an embodiment, the storage unit 310 and the program code 312 may be omitted and the processor 300 may include a storage unit with stored program code.

The processor 300 may implement any one of the steps in exemplified embodiments on the wireless terminal 30, e.g., by executing the program code 312.

The communication unit 320 may be a transceiver. The communication unit 320 may as an alternative or in addition be combining a transmitting unit and a receiving unit configured to transmit and to receive, respectively, signals to and from a wireless network node (e.g. a base station).

Figure 4:
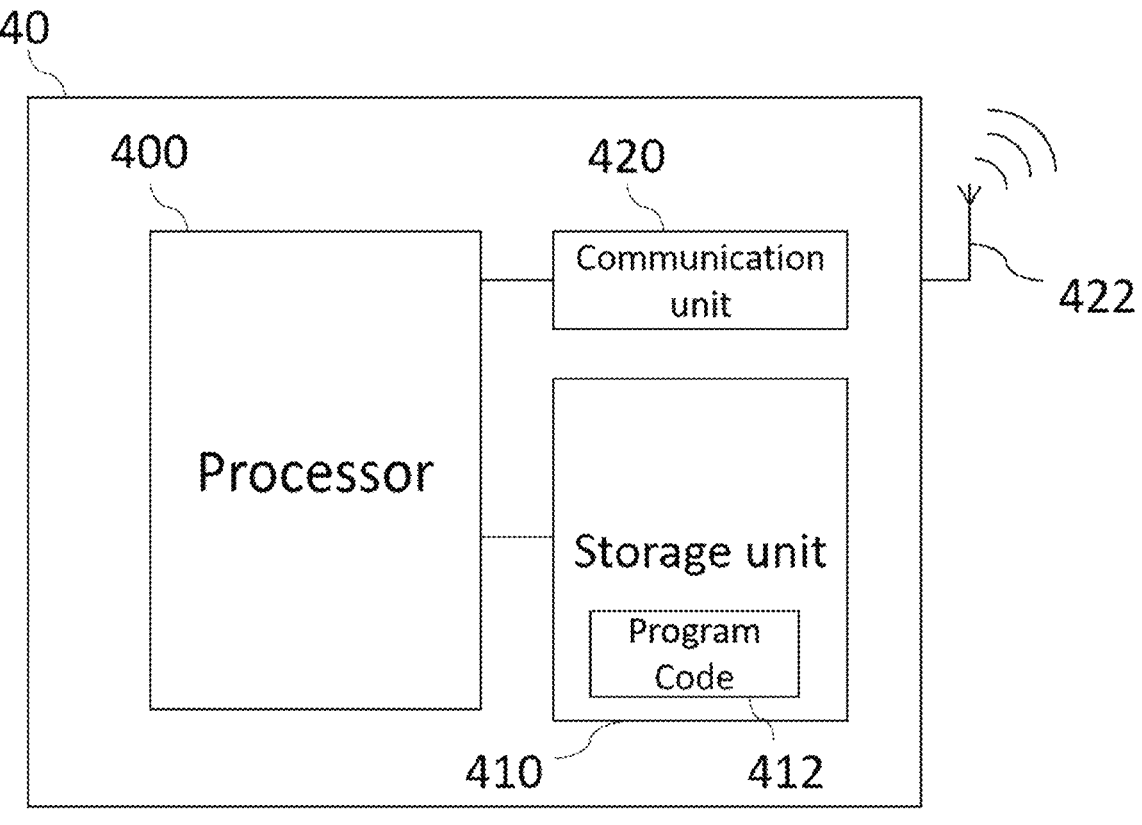
FIG. 4 shows an example of a schematic diagram of a wireless network node according to an embodiment of the present disclosure.

FIG. 4 relates to a schematic diagram of a wireless network node 40 according to an embodiment of the present disclosure. The wireless network node 40 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 40 may comprise (perform) at least one network function such as an access and mobility management function (AMF), a session management function (SMF), a user place function (UPF), a policy control function (PCF), an application function (AF), etc. The wireless network node 40 may include a processor 400 such as a microprocessor or ASIC, a storage unit 410 and a communication unit 420. The storage unit 410 may be any data storage device that stores a program code 412, which is accessed and executed by the processor 400. Examples of the storage unit 410 include but are not limited to a SIM, ROM, flash memory, RAM, hard-disk, and optical data storage device. The communication unit 420 may be a transceiver and is used to transmit and receive signals (e.g. messages or packets) according to processing results of the processor 400. In an example, the communication unit 420 transmits and receives the signals via at least one antenna 422 shown in FIG. 4.

In an embodiment, the storage unit 410 and the program code 412 may be omitted. The processor 400 may include a storage unit with stored program code.

The processor 400 may implement any steps described in exemplified embodiments on the wireless network node 40, e.g., via executing the program code 412.

The communication unit 420 may be a transceiver. The communication unit 420 may as an alternative or in addition be combining a transmitting unit and a receiving unit configured to transmit and to receive, respectively, signals to and from a wireless terminal (e.g. a user equipment).

In general, in an embodiment, during the UE registration procedure, the AMF performs slice authentication and authorization procedure. When the S-NSSAI with the V2X type is successfully authenticated and authorized, the PCF provides the authorized PC5 QoS parameter(s) to the NG-RAN via the AMF and/or provides the V2X related policy over the PC5 to the UE via the AMF. Otherwise the PCF may not provide the PC5 QoS parameter(s) and/or the V2X related policy over the PC5 to the NG-RAN and the UE, respectively.

In an embodiment, when the UE requests radio resource authorization from the NG-RAN, the UE provides requested S-NSSAI towards the NG-RAN, so the NG-RAN can perform V2X authorization based on the requested S-NSSAI and the information provided from the AMF.

In an embodiment, V2X related policy/parameters over PC5 sent to the UE is enhanced to include a mapping of the V2X service types (e.g. PSIDs or ITS-AIDs) to network slices (e.g. S-NSSAI).

In an embodiment, V2X PC5 related parameters sent to the NG-RAN is enhanced so the PC5 QoS parameter is per S-NSSAI. In addition, a UE-PC5-Slice-AMBR per S-NS-SAI may be introduced in the V2X PC5 related parameters sent to the NG-RAN, to identify the aggregated MBR over the PC5 per slice.

In an embodiment, the PC5 QoS information sent to the AMF is extended to include an area of validity (e.g. validity area) for the PC5 QoS parameters (e.g. a tracking area (TA) list), together with the PC5 QoS parameter, so that the AMF can determine whether the PC5 QoS parameters provided by the PCF can be used towards the NG-RAN based on the current location of the UE.

Embodiment 1

Figure 5:
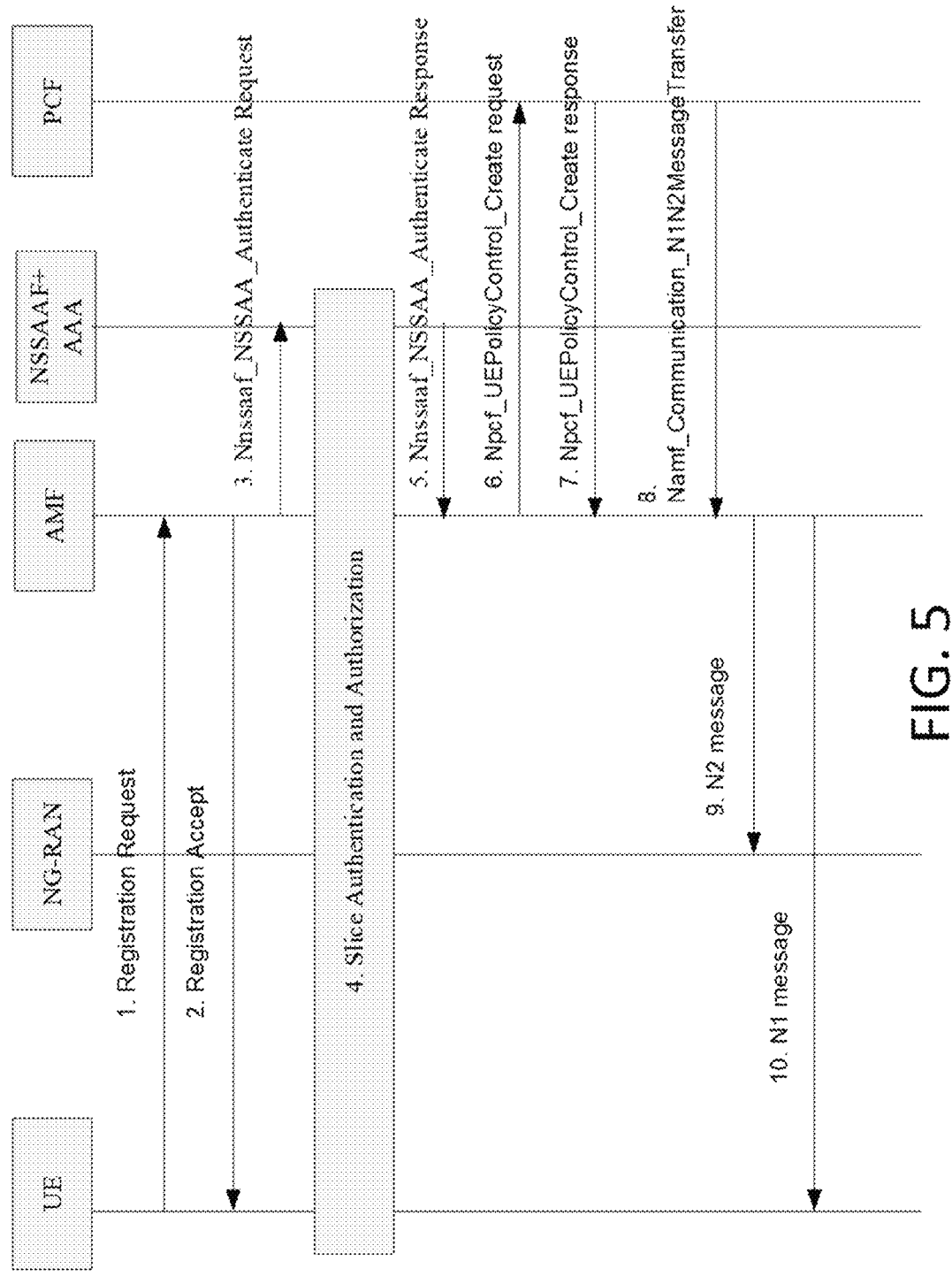
FIG. 5 illustrates PCF provisions N2 PC5 QoS parameters for a non-roaming case according to an embodiment of the present disclosure.

FIG. 5 illustrates PCF provisions N2 PC5 QoS parameters for a non-roaming case according to an embodiment of the present disclosure.

As illustrated in FIG. 5, after the V2X type NSSAI is successfully authenticated and authorized, the AMF provides the V2X type NSSAI towards the PCF. The PCF then provides the PC5 QoS parameters based on the V2X type NSSAI to NG-RAN.

In particular, the steps illustrated in FIG. 5 are as follows, wherein the numbering corresponds to the numbering illustrated in FIG. 5:

1. The UE initiates a Registration Request message towards the NG-RAN. The UE provides the requested NSSAI in the message. The UE also provides the PC5 capability for V2X in this message. The NG-RAN selects an AMF and forwards the Registration Request to the AMF.
2. The AMF performs Registration procedure and accepts the UE registration. The AMF allocates a 5G-GUTI (5G Globally Unique Temporary Identifier) to identify the UE. The AMF determines the allowed NSSAI which the UE is allowed to use in the current Registration Area and sends Registration Accept message (Registration Area, allowed NSSAI) towards the UE. The allowed NSSAI does not include the S-NSSAI subject for NSSAA (Network Slice Specific Authentication and Authorization).
3. When the subscription indicates S-NSSAI is subject for NSSAA, the AMF sends a Nnssaaf_NSSAA_Authentication Request (S-NSSAI) to the NSSAAF to perform slice authentication and authorization for each S-NS-SAI.
4. The NSSAAF and AAA performs the slice authentication and authorization procedure. There may be several messages exchanged between the UE and AAA.
5. The NSSAAF sends Nnssaaf_NSSAA_Authentication Response (result, S-NSSAI) to the AMF, indicating whether the S-NSSAI has been successfully authenticated and authorized. After this step the AMF then adds the S-NSSAI in the Allowed NSSAI and sends the new Allowed NSSAI to the UE.
6. If there is any new V2X type S-NSSAI within the Allowed NSSAI, and the UE supports the PC5 capability for V2X, the AMF selects a PCF for V2X related policy and sends Npcf_UEPolicyControl_Create request to PCF including the PC5 capability for V2X that UE indicates in step 1. The AMF may also provide the V2X type S-NSSAI(s) to the PCF.

7. The PCF sends Npcf_UEPolicyControl_Create Response to the AMF.
8. Based on the local configuration and the V2X type S-NSSAI(s) the PCF determines the V2X Policy over PC5 for UE and the PC5 QoS parameters. If the PCF determines the V2X type S-NSSAI is used for PC5 communication, the PCF may include a new parameter UE-PC5-slice-AMBR which is applicable only for the V2X type S-NSSAI in the PC5 QoS parameters.

The PCF sends Namf_Communication_ N1N2MessageTransfer request to AMF including the V2X related policy and the authorized PC5 QoS parameter for each V2X type S-NSSAI. If no V2X type S-NSSAI is received from the AMF, the PCF provides full V2X related Policy over PC5 for UE and the PC5 QoS parameters to the AMF.

The AMF stores the PC5 QoS parameters as part of UE context.
9. The AMF forwards the authorized PC5 QoS parameters for each V2X type S-NSSAI in the NGAP message to the NG-RAN. The NG-RAN stores the authorized PC5 QoS parameters.
10. The AMF forwards the V2X related policy to the UE. Step 10 may be piggybacked in step 9.

Embodiment 2

Figure 6:
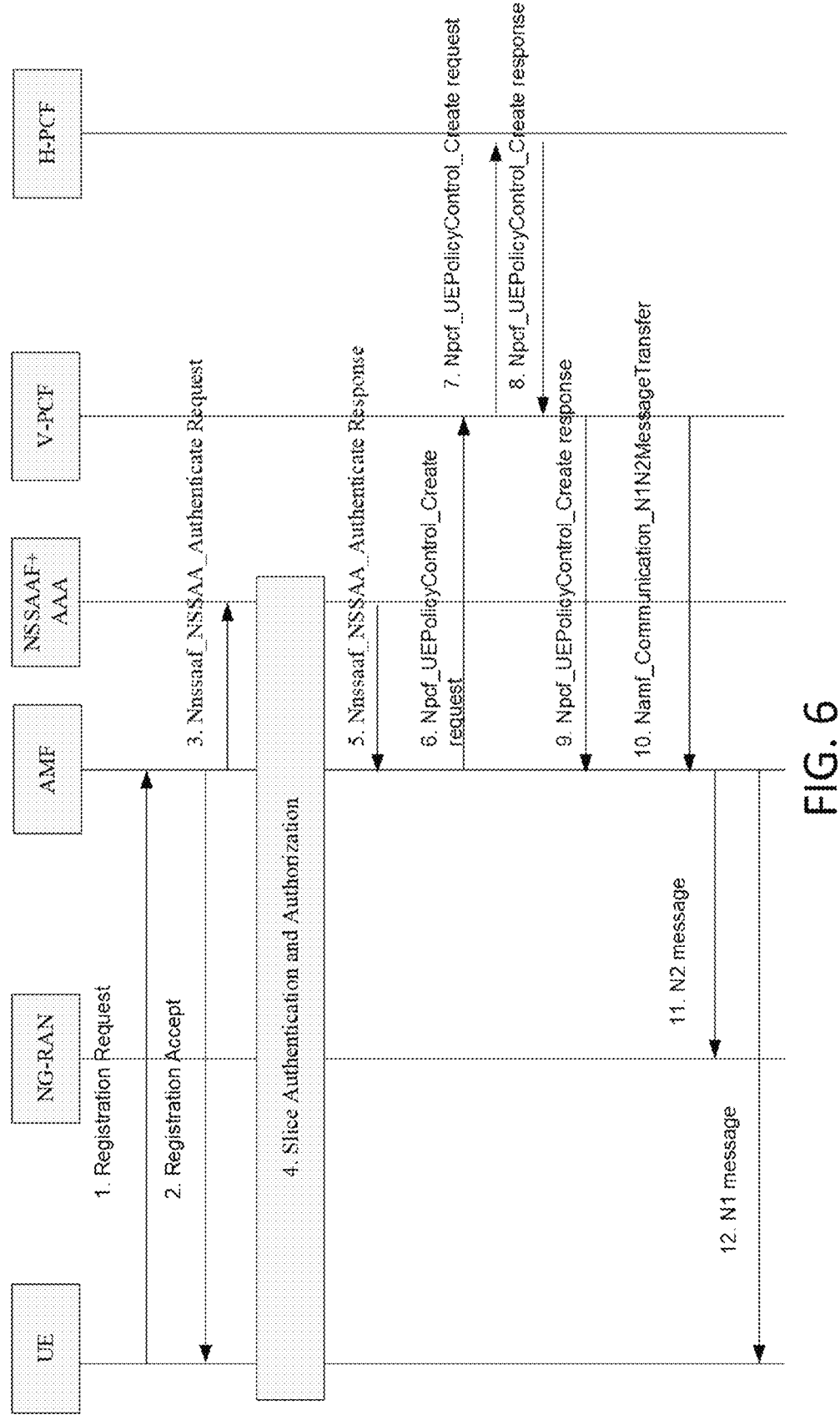
FIG. 6 illustrates PCF provisions N2 PC5 QoS parameters for a roaming case according to an embodiment of the present disclosure.

FIG. 6 illustrates PCF provisions N2 PC5 QoS parameters for a roaming case according to an embodiment of the present disclosure. In particular, FIG. 6 illustrates the provision of the V2X related policy and PC5 QoS parameters based on the V2X type NSSAI received from AMF by the PCF for a roaming case.

In particular, the steps illustrated in FIG. 6 are as follows, wherein the numbering corresponds to the numbering illustrated in FIG. 6:

1. The UE initiates Registration Request message towards the NG-RAN. The UE provides the requested NSSAI in the message. The UE also provides the PC5 capability for V2X in this message. The NG-RAN selects an AMF and forwards the Registration Request to the AMF.
2. The AMF performs Registration procedure and accepts the UE registration. The AMF allocates a 5G-GUTI (5G Globally Unique Temporary Identifier) to identify the UE. The AMF determines the allowed NSSAI which the UE is allowed to use in the current Registration Area and sends Registration Accept message (Registration Area, allowed NSSAI) towards the UE. The allowed NSSAI does not include the S-NSSAI subject for NSSAA (Network Slice Specific Authentication and Authorization).
3. When the subscription indicates S-NSSAI is subject for NSSAA, the AMF sends Nnssaaf_NSSAA_Authentication Request (S-NSSAI) to the NSSAAF to perform slice authentication and authorization for each S-NS-SAI.
4. The NSSAAF and AAA performs the slice authentication and authorization procedure. There may be several messages exchanged between the UE and AAA.
5. The NSSAAF sends Nnssaaf_NSSAA_Authentication Response (result, S-NSSAI) to the AMF, indicating whether the S-NSSAI has been successfully authenticated and authorized. After this step the AMF then adds the S-NSSAI in the Allowed NSSAI and sends the newly Allowed NSSAI to the UE.

6. If there is any new V2X type S-NSSAI within the Allowed NSSAI, and the UE supports the PC5 capability for V2X the AMF selects an H-PCF (PCF in the home PLMN) and V-PCF (PCF in the visited PLMN) for V2X related policy and sends Npcf_UEPolicyControl_Create request to V-PCF including the PC5 capability for V2X that UE indicates in step 1. The AMF also provides the V2X type NSSAI and the corresponding mapped HPLMN NSSAI to the V-PCF.

7. V-PCF sends Npcf_UEPolicyControl_Create request to H-PCF including the PC5 capability for V2X received in step 3. If received, the V-PCF also includes the corresponding mapped HPLMN V2X type NSSAI to the H-PCF.

8. The H-PCF determines the V2X related Policy over PC5 and the authorized PC5 QoS parameters based on the mapped HPLMN V2X type NSSAI for UE. If the H-PCF determines the V2X type S-NSSAI is used for PC5 communication, the H-PCF may include a new parameter UE-PC5-slice-AMBR which is applicable only for the mapped HPLMN V2X type S-NSSAI in the PC5 QoS parameters. The H-PCF sends Npcf_UEPolicyControl_Create response to V-PCF including the determined V2X related policy information and the authorized PC5 QoS parameters for each mapped HPLMN V2X type S-NSSAI.

9. The V-PCF sends Npcf_UEPolicyControl_Create response to the AMF.

10. Based on the local configuration the V-PCF may modify the authorized PC5 QoS parameter received from the H-PCF. The V-PCF sends Namf_Communication_N1N2MessageTransfer request to AMF including the received V2X related policy and the authorize PC5 QoS parameter for each V2X type S-NSSAI within the allowed NSSAI. The AMF stores the PC5 QoS parameters as part of UE context.

11. The AMF forwards the authorized PC5 QoS parameters for each V2X type S-NSSAI in the NGAP message to the NG-RAN. The NG-RAN stores the authorized PC5 QoS parameters.

12. The AMF forwards the V2X related policy to the UE. Step 12 maybe piggybacked in step 11.

Embodiment 3

Figure 7:
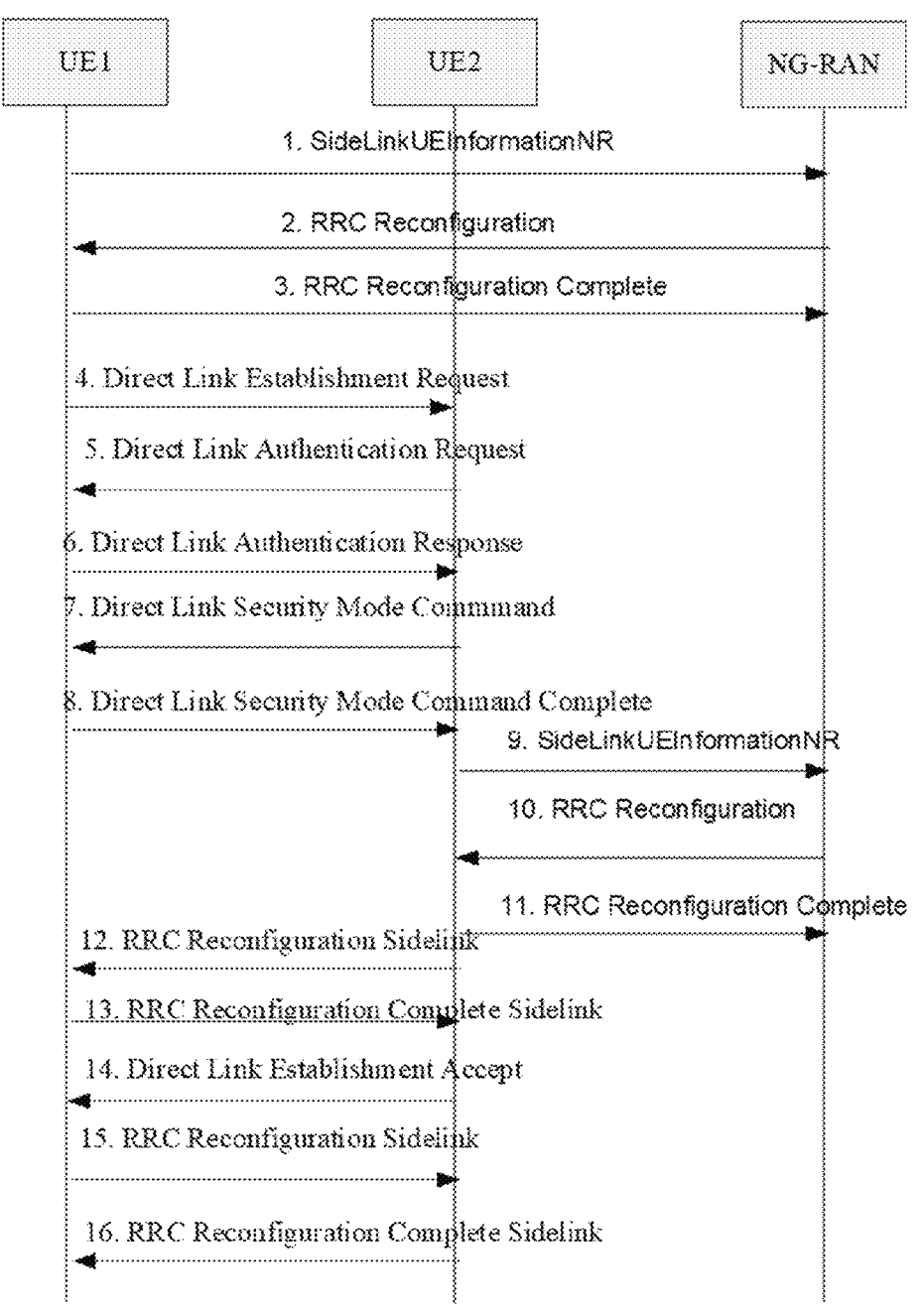
FIG. 7 illustrates NG-RAN authorizing the PC5 QoS parameter for network scheduled mode UE according to an embodiment of the present disclosure.

FIG. 7 illustrates NG-RAN authorizing the PC5 QoS parameter for network scheduled mode UE according to an embodiment of the present disclosure. In particular, FIG. 7 illustrates the authorization of the resource request from network scheduled mode UE by the NG-RAN.

In particular, the steps illustrated in FIG. 7 are as follows, wherein the numbering corresponds to the numbering illustrated in FIG. 7:

1. When the application in UE1 needs to communicate via PC5, UE1 sends SideLinkUEInformationNR message towards the NG-RAN to ask for authorization for PC5 communication. Based on the V2X related policy the UE determines the requested S-NSSAI and the requested PC5 QoS profile for the application and includes them in this message. Each PC5 QoS profile includes an QoS flow identifier.

2. Based on the authorized PC5 QoS parameter per S-NSSAI received from AMF, the NG-RAN determines whether the request S-NSSAI is authorized and whether the requested PC5 QoS profile is authorized. If the request is authorized, the NG-RAN sends RRC reconfiguration to UE1 to establish the radio bearer over the PC5. The RRC reconfiguration includes radio bearer information identified by a radio bearer identity and mapping information between the authorized QoS flow identity and the radio bearer identity.

3. UE1 sends RRC Reconfiguration Complete to the NG-RAN.

4. UE1 sends Direct Link Establishment Request towards UE2. UE1 determines the target UE2 address and the service information of the application from the V2X related policy. In an embodiment, Direct Link Establishment Request may include the service information, the source user information and the target user information.

5. Based on the target user information, UE2 identifies it is the target UE. UE2 initiates Direct Link Authentication request towards the UE1 to perform mutual authentication and to derive a new security key shared between the two UEs. This message includes the Key establishment information container.

6. If the target UE determines that the DIRECT LINK AUTHENTICATION REQUEST message can be accepted, the target UE shall create a DIRECT LINK AUTHENTICATION RESPONSE message. This message includes the Key establishment information container.

7. After the mutual authentication success and a security key is generated between the two UEs, UE2 sends Direct Link Security Mode Command to establish security between the two UEs. This message includes the security algorithms for integrity protection and ciphering protection. The UE2 shall not cipher the DIRECT LINK SECURITY MODE COMMAND message but shall integrity protect it with the new security context.

8. UE1 establishes the security context and sends Direct Link Security Mode Command Complete to UE2. The selected security algorithms and keys are used to integrity protect and cipher all PC5 signaling messages exchanged over this PC5 unicast link between the UEs and the security context can be used to protect all PC5 user plane data exchanged over this PC5 unicast link between the UEs. This message includes the authorized PC5 QoS profile including the QoS flow identifier and shall be ciphered and integrated.

9. UE2 determines based on the V2X related policy the Requested S-NSSAI that the application can use and send SideLinkUEInformationNR message towards the NG-RAN for resource authorization. This message includes the requested S-NSSAI and the requested PC5 QoS profile received from UE1. Each PC5 QoS profile includes an QoS flow identifier.

10. Based on the authorized PC5 QoS parameter per S-NSSAI received from AMF, the NG-RAN determines whether the request S-NSSAI is authorized and whether the requested PC5 QoS profile is authorized. If the request is authorized the NG-RAN sends RRC reconfiguration to UE2 to establish the radio bearer over the PC5. The RRC reconfiguration includes radio bearer information identified by a radio bearer identity and mapping information between the authorized QoS flow identity and the radio bearer identity.

11. UE2 sends RRC Reconfiguration Complete to the NG-RAN.

12. Based on the radio bearer information, UE2 sends RRC Reconfiguration Sidelink towards UE1 to establish the radio bearers over the PC5.

13. UE1 allocates the radio bearer resource and sends RRC Reconfiguration Complete Sidelink to UE2.

14. UE2 sends Direct Link Establishment Accept to UE1. In an embodiment, this message incudes the accepted QoS profile including the QoS flow identifier.

15. Based on the radio bearer information the NG-RAN and the accepted QoS profile from UE1, UE1 sends RRC Reconfiguration Sidelink towards UE2 to establish the radio bearers over the PC5.

16. UE2 allocates the radio bearer resource and sends RRC Reconfiguration Complete Sidelink to UE1.

After this procedure, the QoS flow and the associated radio bearers are established over PC5 between UE1 and UE2. UE1 and UE2 can start PC5 communication over the QoS flow.

Embodiment 4

Figure 8:
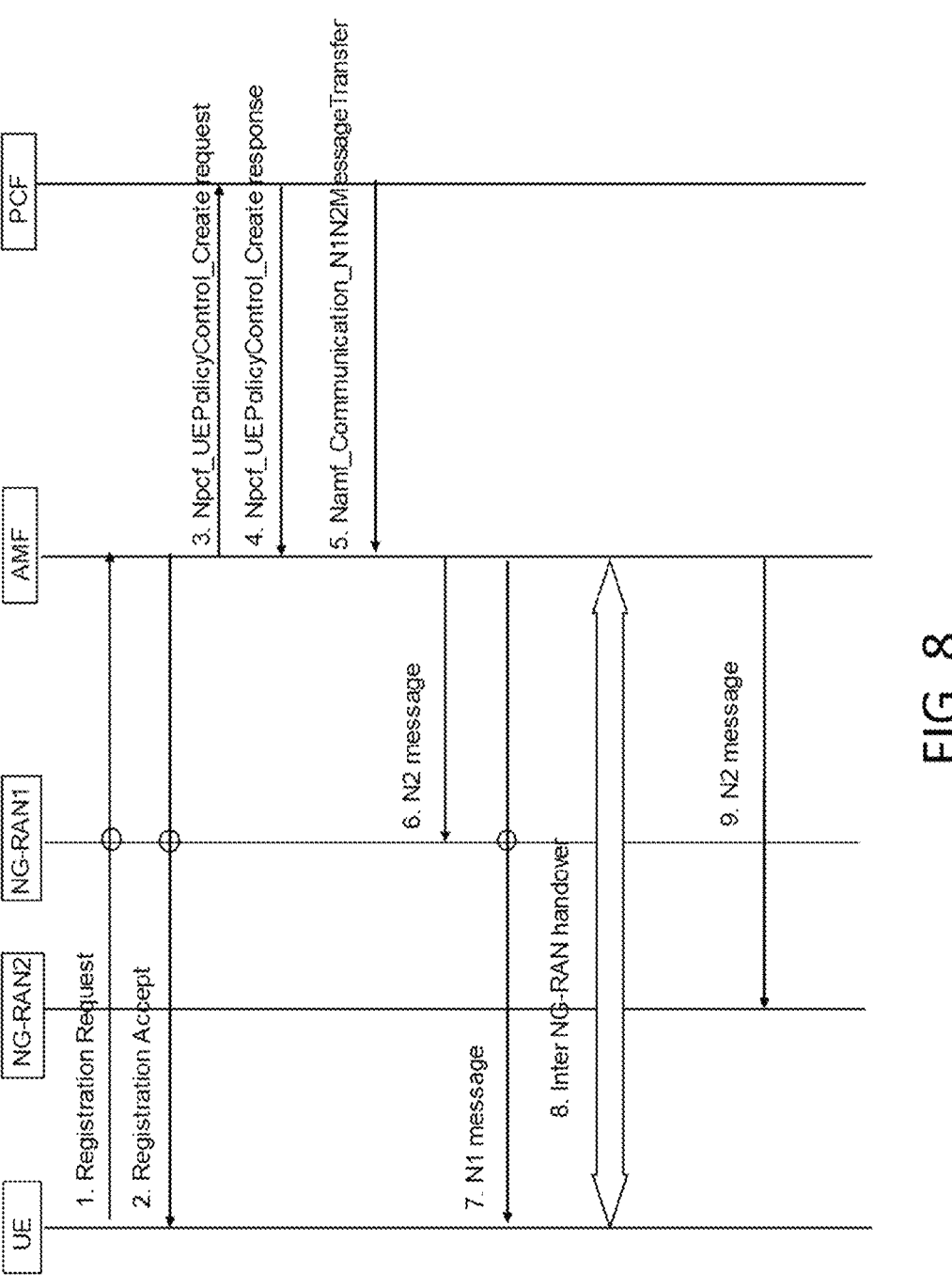
FIG. 8 illustrates the AMF sending PC5 QoS parameter to NG-RAN based on the area of validity for the PC5 QoS parameters according to an embodiment of the present disclosure.

FIG. 8 illustrates the AMF sending the PC5 QoS parameter to NG-RAN based on the area of validity for the PC5 QoS parameters according to an embodiment of the present disclosure.

In particular, the steps illustrated in FIG. 8 are as follows, wherein the numbering corresponds to the numbering illustrated in FIG. 8:

1. The UE initiates Registration Request message towards the NG-RAN. The UE provides the requested NSSAI in the message. The UE also provides the PC5 capability for V2X in this message. The NG-RAN selects an AMF and forwards the Registration Request to the AMF.

2. The AMF performs Registration procedure and accepts the UE registration. The AMF allocates a 5G-GUTI (5G Globally Unique Temporary Identifier) to identify the UE. The AMF determines the allowed NSSAI which the UE is allowed to use in the current Registration Area and sends Registration Accept message (Registration Area, allowed NSSAI) towards the UE.

3. If there is any new V2X type S-NSSAI within the Allowed NSSAI, and the UE supports the PC5 capability for V2X, the AMF selects a PCF for V2X related policy and sends Npcf_UEPolicyControl_Create request to PCF including the PC5 capability for V2X that UE indicates in step 1. The AMF may also provide the V2X type S-NSSAI(s) to the PCF.

4. The PCF sends Npcf_UEPolicyControl_Create Response to the AMF.

5. Based on the local configuration and the V2X type S-NSSAI(s), the PCF determines the V2X Policy over PC5 for UE and the PC5 QoS parameters together with the area of validity for the PC5 QoS parameters. If the PCF determines the V2X type S-NSSAI is used for PC5 communication, the PCF may include a new parameter UE-PC5-slice-AMBR which is applicable only for the V2X type S-NSSAI in the PC5 QoS parameters.

The PCF sends Namf_Communication_N1N2MessageTransfer request to AMF including the V2X related policy, the authorized PC5 QoS parameter and the corresponding validity area. If no V2X type S-NSSAI is received from the AMF, the PCF provides full V2X related Policy over PC5 for UE and the PC5 QoS parameters to the AMF.

The AMF stores the PC5 QoS parameters and the corresponding validity area as part of UE context.

6. The AMF forwards the authorized PC5 QoS parameters for each V2X type S-NSSAI in the NGAP message to the NG-RAN. The NG-RAN stores the authorized PC5 QoS parameters.

7. The AMF forwards the V2X related policy to the UE. Step 7 maybe piggybacked in step 6.

8. UE moves (is handover) from NG-RAN1 to NG-RAN2 (e.g. via a handover procedure).

9. If the area of validity for the PC5 QoS parameters is received in step 5, it is used by the AMF to determine whether the PC5 QoS parameters provided by the PCF can be used towards the NG-RAN2 based on the current location of the UE. If the location of the UE is outside an area indicated by the "area of validity for the PC5 QoS parameters", the AMF does not send the PC5 QoS parameters to the NG-RAN2.

FIG. 9 shows a flowchart of a process according to an embodiment of the present disclosure. The process shown in FIG. 9 may be used in a wireless device comprising (e.g. performing) an AMF and comprises the following step:

Step 900: Transmit, to a PCF, allowed NSSAI associated with a wireless terminal (e.g. UE).

In the process shown in FIG. 9, the wireless device (e.g. the AMF) transmits allowed NSSAI to a PCF, e.g., when determining there is newly allowed NSSAI. In an embodiment, the allowed NSSAI comprises at least one (allowed) S-NSSAI.

In an embodiment, at least one single-NSSAI in the allowed NSSAI is associated with V2X (e.g. service, application or network slice). For example, the wireless device transmits the allowed NSSAI to the PCF when determining that at least one S-NSSAI within the allowed NSSAI associated with V2X service and that the wireless terminal supports PC5 capability for V2X.

In an embodiment, the wireless device receives at least one PC5 QoS parameter associated with at least one allowed S-NSSAI in the NSSAI from the PCF and transmits the at least one PC5 QoS parameter and the at least one allowed S-NSSAI to a first radio access network (RAN) node (e.g. NG-RAN).

In an embodiment, the at least one PC5 QoS parameter comprises an AMBR per network slice.

In an embodiment, the wireless device receives a validity area of the at least one PC5 QoS parameter from the PCF.

In an embodiment, when receiving an indication of a handover of moving the wireless terminal to a second RAN node, the wireless device determines whether to transmit the at least one PC5 QoS parameter to the second RAN node based on the validity area and a location of the wireless terminal. For example, when the wireless terminal remains in the validity of the at least one PC5 QoS parameter, the wireless device transmits the at least one PC5 QoS parameter to the second RAN node. Otherwise, the wireless device does not transmit the at least one PC5 QoS parameter to the second RAN node.

In an embodiment, the wireless device receives, from the PCF, a V2X service policy comprising a mapping between at least one service and at least one S-NSSAI associated with a PC5 communication, and transmits, to the wireless terminal, the V2X service policy.

FIG. 10 shows a flowchart of a process according to an embodiment of the present disclosure. The process shown in FIG. 10 may be used in a wireless device comprising (e.g. performing) a PCF and comprises the following step:

Step 1000: Receive, from an access and mobility management function allowed network slice selection assistance information associated with a wireless terminal.

In the process shown in FIG. 10, the wireless device (i.e. PCF) receives, from an AMF allowed NSSAI associated with a wireless terminal (e.g. UE).

In an embodiment, at least one S-NSSAI in the allowed NSSAI is associated with a V2X service (e.g. application or network slice) for a PC5 communication.

In an embodiment, the PCF transmits, to the AMF, at least one PC5 QoS parameter associated with at least one allowed S-NSSAI in the NSSAI. For example, the PCF may determine at least one allowed S-NSSAI in the allowed NSSAI is associated with a V2X service and transmits the at least one PC5 QoS parameter to the AMF.

In an embodiment, the at least one PC5 QoS parameter comprises an AMBR per network slice.

In an embodiment, the wireless device may transmit, to the AMF, a validity area of the at least one PC5 QoS parameter.

In an embodiment, the wireless device may transmit to the AMF, a V2X service policy comprising a mapping between at least one service and at least one S-NSSAI associated with a PC5 communication.

FIG. 11 shows a flowchart of a process according to an embodiment of the present disclosure. The process shown in FIG. 11 may be used in a wireless network node (e.g. RAN or NG-RAN) and comprises the following step:

Step 1100: Receive, from a policy control function via an access and mobility management function, at least one PC5 quality-of-service parameter of at least one allowed single network slice selection assistance information.

In the process shown in FIG. 11, the wireless network node receives at least one PC5 QoS parameter of at least one allowed S-NSSAI from a PCF via an AMF.

In an embodiment, the at least one allowed S-NSSAI is associated with a V2X service for a PC5 communication.

In an embodiment, the wireless network node may receive a requested S-NSSAI and a requested QoS file for a PC5 communication from a wireless terminal (e.g. UE) and determines whether to authorize the requested S-NSSAI and the requested QoS file for the PC5 communication based on the received at least one PC5 QoS parameter per allowed S-NSSAI. When determining that the requested S-NSSAI and the requested QoS file are authorized based on the received at least one PC5 QoS parameter per allowed S-NSSAI, the wireless network node transmits radio bearer information of the PC5 communication to the wireless terminal.

FIG. 12 shows a flowchart of a process according to an embodiment of the present disclosure. The process shown in FIG. 12 may be used in a wireless terminal (e.g. UE) and comprises the following step:

Step 1200: Receive, from a policy control function via an access and mobility management function, a vehicle-to-everything service policy comprising a mapping between at least one service and at least one allowed single network slice selection assistance information associated with a PC5 communication.

In the process shown in FIG. 12, the wireless terminal receives a V2X service policy from a PCF via an AMF. In this embodiment, the V2X service policy comprises a mapping between at least one service and at least one allowed S-NSSAI associated with a PC5 communication.

In an embodiment, the wireless terminal further determines a requested S-NSSAI for a PC5 communication based on the V2X service policy and transmits the requested S-NSSAI and related requested QoS file to an RAN node, for the PC5 communication.

In an embodiment, the wireless terminal receives radio bearer information of the PC5 communication from the RAN node, e.g., when requested S-NSSAI and the requested QoS file are authorized. In such a case, the wireless terminal establishes a radio bearer of the PC5 communication with a peer wireless terminal.

In summary, as apparent from the foregoing description, embodiments comprise the following general aspects.

The AMF provides the allowed V2X type S-NSSAI to the PCF.

The AMF receives the PC5 QoS parameters of the allowed V2X type S-NSSAI from the PCF.

The AMF sends the PC5 QoS parameter and the allowed V2X type S-NSSAI to the NG-RAN.

PC5 QoS parameter includes the aggregated MBR per (network) slice.

The PCF receives allowed V2X type S-NSSAI from the AMF.

The PCF sends PC5 QoS parameter of the allowed V2X type S-NSSAI to the AMF.

The PCF sends Area of validity of the PC5 QoS parameter to the AMF.

The PCF sends the mapping of the application (e.g. service) to the S-NSSAI for PC5 communication to the UE.

The NG-RAN receives authorized PC5 QoS parameter of the allowed V2X type S-NSSAI from the AMF.

The NG-RAN receives requested S-NSSAI and requested QoS profile from the UE for authorization.

The NG-RAN sends radio bearer information to the UE after the requested S-NSSAI and requested QoS profile are authorized.

The UE determines the requested S-NSSAI and requested QoS profile for PC5 communication.

The UE sends the requested S-NSSAI and the requested QoS profile to the NG-RAN for authorization.

The UE receives the radio bearer information from the NG-RAN.

The UE establishes the radio bearer towards a peer UE.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in an access and mobility management function, the wireless communication method comprising:

transmitting, to a policy control function (PCF), allowed network slice selection assistance information (NSSAI) associated with a wireless terminal, wherein at least one allowed single-NSSAI (S-NSSAI) in the allowed NSSAI is associated with a vehicle-to-everything service;

receiving, from the PCF, a validity area of at least one PC5 quality-of-service (QoS) parameter;

receiving an indication of a handover of the wireless terminal to a second radio access network node; and determining whether to transmit the at least one PC5 QoS parameter to the second radio access network node based on the received validity area and a location of the wireless terminal.

2. The wireless communication method of claim 1, further comprising:

receiving, from the PCF, at least one PC5 quality-of-service (QoS) parameter associated with the at least one allowed S-NSSAI in the allowed NSSAI, and transmitting, to a first radio access network node, the at least one PC5 QoS parameter and the at least one allowed S-NSSAI, wherein the at least one PC5 QoS parameter comprises an aggregated maximum bit rate per network slice.

3. The wireless communication method of claim 1, further comprising:

receiving, from the PCF, a vehicle-to-everything service policy comprising a mapping between at least one service and at least one S-NSSAI associated with a PC5 communication, and transmitting, to the wireless terminal, the vehicle-to-everything service policy.

4. A wireless communication method for use in a policy control function, the wireless communication method comprising:

receiving, from an access and mobility management function (AMF), allowed network slice selection assistance information (NSSAI) associated with a wireless terminal, wherein at least one allowed single-NSSAI (S-NSSAI) in the allowed NSSAI is associated with a vehicle-to-everything service for a PC5 communication; and transmitting, to the AMF, a validity area of at least one PC5 quality-of-service (QoS) parameter, wherein the validity area is for use by the AMF to determine whether to transmit the at least one PC5 QoS parameter to a second radio access network node during a handover of the wireless terminal.

5. The wireless communication method of claim 4, further comprising:

transmitting, to the AMF, at least one PC5 quality-of-service (QoS) parameter associated with the at least one allowed S-NSSAI in the allowed NSSAI.

6. The wireless communication method of claim 5, wherein the at least one PC5 QoS parameter comprises an aggregated maximum bit rate per network slice.

7. The wireless communication method of claim 4, further comprising:

transmitting, to the AMF, a vehicle-to-everything service policy comprising a mapping between at least one service and at least one S-NSSAI associated with a PC5 communication.

8. A wireless communication method for use in a radio access network node, the wireless communication method comprising:

receiving, from a policy control function (PCF) via an access and mobility management function (AMF), at least one PC5 quality-of-service (QoS) parameter of at least one allowed single network slice selection assistance information (S-NSSAI), wherein the at least one PC5 QoS parameter is received by the radio access network node when acting as a target node in a handover procedure for a wireless terminal, and wherein the transmission of the at least one PC5 QoS parameter from the AMF is determined based on a validity area associated with the at least one PC5 QoS parameter.

9. The wireless communication method of claim 8, wherein the at least one allowed S-NSSAI is associated with a vehicle-to-everything service for a PC5 communication.

10. The wireless communication method of claim 8, further comprising:

receiving, from a wireless terminal, a requested S-NSSAI and a requested QoS file for a PC5 communication, and transmitting, to the wireless terminal, radio bearer information of the PC5 communication when determining the requested S-NSSAI and the requested QoS file are authorized based on the at least one PC5 QoS parameter of the at least one allowed S-NSSAI.

11. A wireless communication method for use in a wireless terminal, the wireless communication method comprising:

receiving, from a policy control function (PCF) via an access and mobility management function (AMF), a vehicle-to-everything service policy comprising a mapping between at least one service and at least one allowed single network slice selection assistance information (S-NSSAI) associated with a PC5 communication;

determining a requested S-NSSAI for a PC5 communication based on the vehicle-to-everything service policy; and transmitting, to a radio access network node, the requested S-NSSAI and a requested QoS file for the PC5 communication.

12. The wireless communication method of claim 11, further comprising:

receiving, from the radio access network node, radio bearer information of the PC5 communication, and establishing, with a peer wireless terminal, a radio bearer of the PC5 communication.

* * * * *